(12) United States Patent
Harrell et al.

(10) Patent No.: US 6,778,519 B1
(45) Date of Patent: Aug. 17, 2004

(54) WIRELESS MULTIPLE FUNCTION PC CARD

(75) Inventors: Jeff Allen Harrell, Salt Lake City, UT (US); Tim Urry Price, Salt Lake City, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/273,301

(22) Filed: Mar. 19, 1999

(51) Int. Cl.$^7$ ................................................ H04J 13/02
(52) U.S. Cl. .................................... 370/342; 370/441
(58) Field of Search ............................. 370/335, 342, 370/441, 338

(56) References Cited

U.S. PATENT DOCUMENTS 5,696,970 A * 12/1997 Sandage et al. ............ 709/324
5,779,496 A    7/1998 Bolinger et al. ............ 439/377

OTHER PUBLICATIONS

Roger Dettmer, "Local network radio the wireless LAN", IEE Review, May 1993, pp. 127–131.*
AT&T News Release, May 18, 1993, "NCR introduces WaveLAN premises–wide wireless networking", from website www.att.com/news/0593/930518.nca.html, retrieved Feb. 23, 2003, pp. 1–4.*
Vincent Vermeer, "Wireless LANs; Why IEEE 802.11 DSSS?", IEEE, 1997, pp. 172–178.*
I.R. Johnson et al., "Standards for wireless LANs", Wireless Technology Digest No. 1996/199, Nov. 1996, pp. 5/1–5/5.*
D.F. Bantz et al., "Wireless LAN Design Alternatives", IEEE Network, Mar./Apr. 1994, pp. 43–53.*
"Multi–Purpose RF ASIC Tranceiver," Philsar Electronics, Ottawa, Canada, Sep. 5, 1998, pp. 1–15.
"Selecting a Wireless LAN Technology," Proxim, www-.proxim.com/learn/whiteppr/select.shtml, pp. 1–11, dated Feb. 10, 1999.
"Multiple Function PC Cards," PCMCIA 1996, www.pc-card.com/papers/multfunc.htm, pp. 1–4.

* cited by examiner

Primary Examiner—Melvin Marcelo
(74) Attorney, Agent, or Firm—Workman Nydegger (57) ABSTRACT

A computing environment in which a plurality of portable computers use a spread spectrum communications link to wirelessly communicate with and receive input from a plurality of peripheral devices. In a preferred embodiment, one or more portable or laptop computers each have a PCMCIA card. The PCMCIA card has an RF transreceiver that sends and receives spread spectrum signals, where each spread spectrum signal identifies and makes a demand upon a peripheral device. The spread spectrum signals from the transreceiver on each PCMCIA card are received by a transreceiver on a docking station that is interfaced to one or more peripheral devices. The docking station 'de-spreads' the spectrum signals and then directs the same to the particular interfaced peripheral device identified in the signal. A similar process is followed in transmitting a spread spectrum signal from one of the interfaced devices to a particular laptop computer.

27 Claims, 4 Drawing Sheets

WIRELESS MULTIPLE FUNCTION PC CARD

BACKGROUND OF THE INVENTION

1. The Field of the Invention

The present invention relates to radio frequency links to computing devices. More particularly, the present invention is related to a wireless attachment of electronic peripheral devices to one or more portable computer systems across an RF link.

2. Present State of the Art

Portable or laptop computers can be interfaced to a variety of peripheral devices such as printers, modems, storage devices, and local area networks. To interface the computer to these peripheral devices, a serial or parallel port is typically used. Other ports such as a Universal Serial Bust (USB) port, can also be used.

As computer housings have been continued to be downsized, internal spacial restrictions have required the establishment of standards for the internal accessories of the computer, particularly with respect to interfacing peripheral devices to the computer housing. One set of standards applicable to memory cards for computers and the attachment of peripheral devices thereto has been developed by the Personal Computer Memory Card Industry Association (PCMCIA).

The PCMCIA standard determines that the spacial standard for all memory cards used in down-sized computers should be restricted to a rectangular space approximately 55 mm in width and 84 mm in length. PCMCIA has set forth standards for three different sizes of cards known respectively as Type I (3.3 mm thick), Type II (5.0 mm thick) and Type III (10.5 mm thick) PC cards. Connectors and guide rails are standardized in all types. These standards, current and future, are referred herein as "thin-architecture" standards. A personal computer card (PC Card) having a thin architectural standard, such as a PCMCIA card, can be used to interface a peripheral to a portable computer.

An electronic device which can be installed on the PCMCIA card is a wireless modem. A wireless modem device enables a portable computer system to communicate with electronic peripheral devices and other computer systems without requiring physical access to land line communication ports. Portable computers with wireless modems can be used in wireless Local Area Networks (LANs). Also, mobile terminals, such as Personal Digital Assistants (PDAs), specialized handheld terminals, and barcode scanners, can be in electronic communication with wireless LANs.

Wireless connections to peripheral devices can be used to significantly increase the profitability of business operations. Mobile data applications can cut operational costs by increasing the productivity of essential personnel. Wireless computing apparatus can also be used to increase revenues by bringing products, services, and transaction points, closer to users. Mobile data networks can be used to increase productivity and quality by providing convenient access to information that results in improved promptness, accuracy, and productivity of users having access to mobile computing devices that are connected wirelessly to a LAN. The realization of administration productivity eliminate redundant paperwork recording services.

The wireless modem typically consists of both a radio portion and a baseband portion. The transmitter in the radio portion generates RF signals using a baseband signal to modulate the carrier signal. The receiver in the radio portion produces a baseband signal from the received RF signals by demodulating the RF signals. An antenna is used for transmitting and receiving the RF communication signals. The baseband portion provides a baseband signal to the transmitter and accepts baseband signals from the receiver.

Portable computer systems such as laptop or notebook computers can be equipped with a wireless modem. A wireless modem can be installed in a PC adapter card or in a PCMCIA adapter slot. One of the constraints of mechanical package designs for PC peripheral card assemblies is that the design has a form factor meeting the requirements for products specified under the PCMCIA standard. PC cards have been designed to contain a variety of electronic devices, such as wireless modems, within the standards of form factor constraints.

The PCMCIA recognizes that rapid advances in the miniaturization of components are allowing developers to place more functionality on a single PC Card. Providing multiple functions on a single PC Card, such as modem and LAN functionality, effectively doubles the amount of functionality that each PC Card slot provides in a so-called "Combo-Card". Although PCMCIA has issued standards for devices such as Multiple Function PC (MFPC) Cards that handle PC Cards delivering multiple I/O functionality to a host platform in a generic manner, problems still remain. With this increase in the amount of functionality in the Combo-Card or MFPC Card, 'real estate' or space constraints of the increased functional integration in a limited form factor present problems. Additionally, complexity and costs of manufacturing the Combo-Card or MFPC Card are problematic.

A problem with thin architecture PC Card technology is that there is a limited number of peripheral devices that can be directly connected to a portable computer. Typically, a maximum of eight devices can be connected to a laptop computer via a thin architecture PC Card. As set forth above, the PCMCIA standard limits the amount of room that can be used for connecting peripheral devices to a portable computer. These form factor limitations pose a significant problem. Additionally, a large amount of circuitry within the PCMCIA standard form factor can cause a significant build up in temperature.

While a peripheral device can be attached or interfaced with a PCMCIA card by a cable, it is also known to use a wireless radio frequency link in a PC Card to connect a peripheral device to the portable computer by the thin architecture PC Card. For the most part, only one peripheral device can be connected to the notebook computer wirelessly using a thin architecture PC Card.

It would be an advancement in the art to provide a computing apparatus, such as a portable personal computer, with a wireless modem, such as a wireless modem in a PC Card or in a PCMCIA card, where the wireless modem is in electrical communication with one or more peripheral devices by an RF link.

It would also be an advancement in the art to provide a larger number than eight peripheral devices in wireless communication with a PCMCIA card in a portable computer or other computing apparatus, while minimizing thermal buildup and without exceeding the form factor limitations of the PCMCIA standard.

SUMMARY AND OBJECTS OF THE INVENTION

It is an object of the invention to wirelessly connect a portable computing device to a peripheral having a bandwidth that is used in conjunction with spread spectrum technology. As used herein a spread spectrum signal is a signal at frequencies between about 2.2 GHz to about 2.6 GHz in any system that occupies more bandwidth than the minimum required for data signal transfer.

It is a further object of the invention to use a thin architecture PC Card in a portable computing device, the PC Card having a wireless transreceiver operating a spread spectrum schema to interface the same with peripheral devices connected to a docking station also having a transreceiver operating at a similar frequencies, where the docking station is interfaced with the peripheral devices.

It is a further object of the present invention to provide a system having a plurality of computing apparatus each of which is interfaced with a transreceiver, each transreceiver being in a wireless communication system using a spread spectrum technology with a docking station, the docking station having a transreceiver and a digital signal processor or microprocessor in electrical communication with a plurality of peripheral interfaces, each peripheral interface being in communication with a peripheral device.

It is yet a further object of the present invention to provide a computing apparatus having a RF communication circuit capable of interfacing with a plurality of peripheral devices while minimizing the amount of hardware required to interface with the peripheral devices.

It is a further object of the present invention to provide a portable computer having a PCMCIA card interface that is in a wireless communication system via an RF link to a plurality of peripheral devices.

It is a still further object of the present invention to identify peripheral devices and their respective capability via an RF link using spread spectrum technology to interface with a portable computer having a thin architecture PC Card interface thereto.

To achieve the foregoing objects, and in accordance with the invention as embodied and broadly described herein, a computing system has a peripheral device for executing an input and or output (I/O) message and a computing device having a transreceiver. The transreceiver transmits a host spread spectrum signal that identifies the pattern of the host spread spectrum signal and the address of the peripheral device that is to execute an I/O message in the host spread spectrum signal. The transreceiver also receives a peripheral spread spectrum signal that identifies the pattern of peripheral spread spectrum signal and the address of the computing device to which an I/O message in the peripheral spread spectrum signal is directed.

Another transreceiver, different than the transreceiver of the computing device, is interfaced to the peripheral device. This transreceiver transmits a peripheral spread spectrum signal from the peripheral device that identifies the pattern of the peripheral spread spectrum signal and the address of the computing device to which an I/O message in the peripheral spread spectrum signal is directed. Also, this transreceiver receives a host spread spectrum signal that identifies the pattern of the spread spectrum signal and the address of the peripheral device that is to execute an I/O message in the host spread spectrum signal.

In another embodiment, the inventive computing environment has a plurality of portable computers each having a PCMCIA card that has an RF transreceiver. Each portable computer uses its RF transreceiver in a spread spectrum wireless link to give output to and receive input from a plurality of peripheral devices. Each RF transreceiver sends and receives spread spectrum signals, where each sent spread spectrum signal identifies and makes a demand upon a particular one peripheral device. The spread spectrum signals from the transreceiver on each PCMCIA card are received by a tranreceiver on a docking station that is interfaced to the plurality of peripheral devices. The docking station 'de-spreads' the spectrum signals and then directs the same to the particular interfaced peripheral device identified in the signal. Similarly, each interfaced peripheral device sends a signal to the docking station that identifies a particular portable computer for spreading and transmission via the transreceiver and its docking station. A particular portable computer identified in the signal from the docking station then receives input from the sending peripheral device after the 'de-spreading' of the signal. As such, each portable computer stretches its PCMCIA interface to respective peripheral devices across a spread spectrum communications link in the sending and receiving of data.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
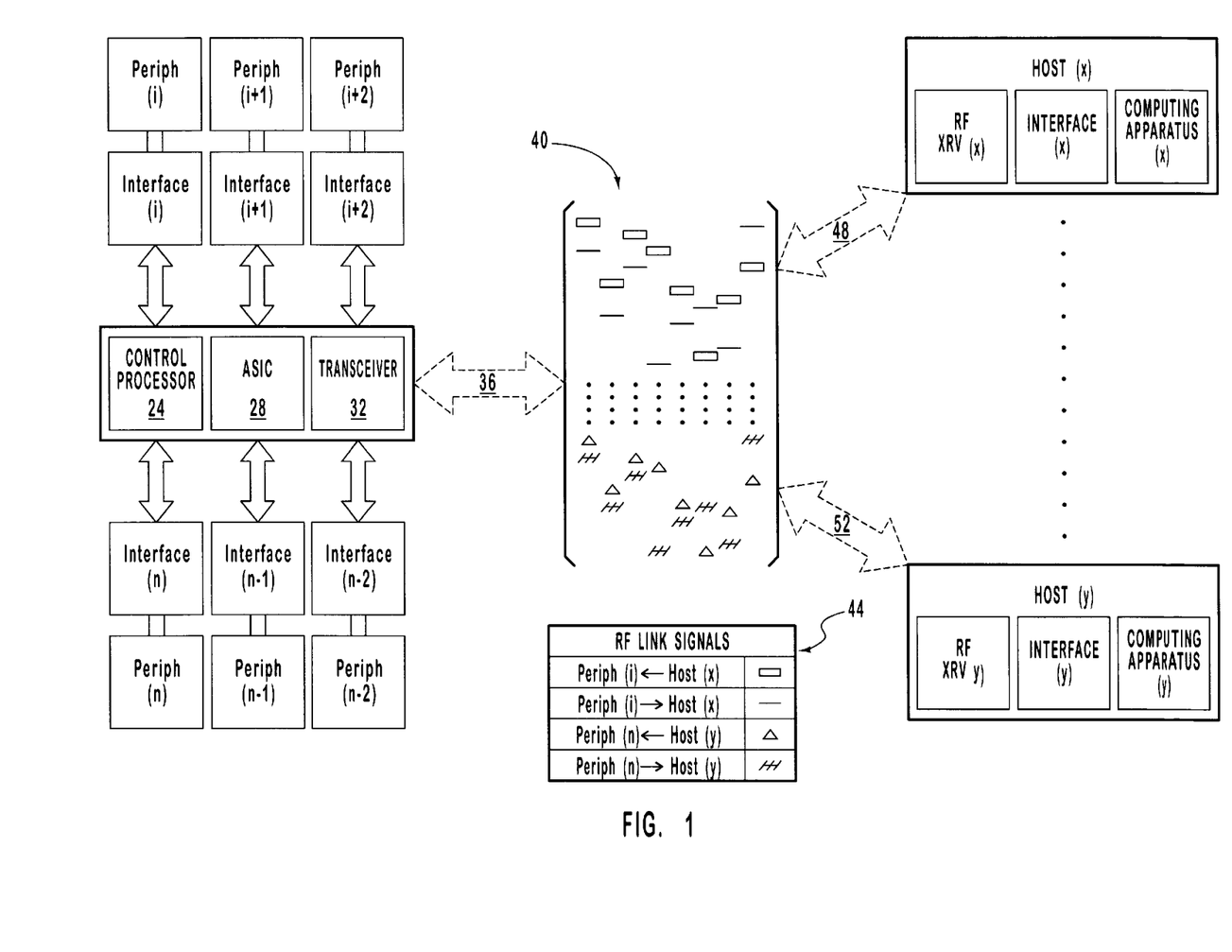
FIG. 1 is a top level block diagram depicting a RF link between a plurality of hosts and a plurality of peripheral devices in which computerized electrical apparatus x through y interface through respective interface devices x through y, each interface device x through y being in communication with a respective transreceiver, each transreceiver transreceiving with a transreceiver path to another transreceiver that is in communication with an Application Specific Integrated Circuit (ASIC), the ASIC being in communication with a controller, and the controller being in communication with peripherals (i) through (n) via respective interfaces thereto.
Figure 2:
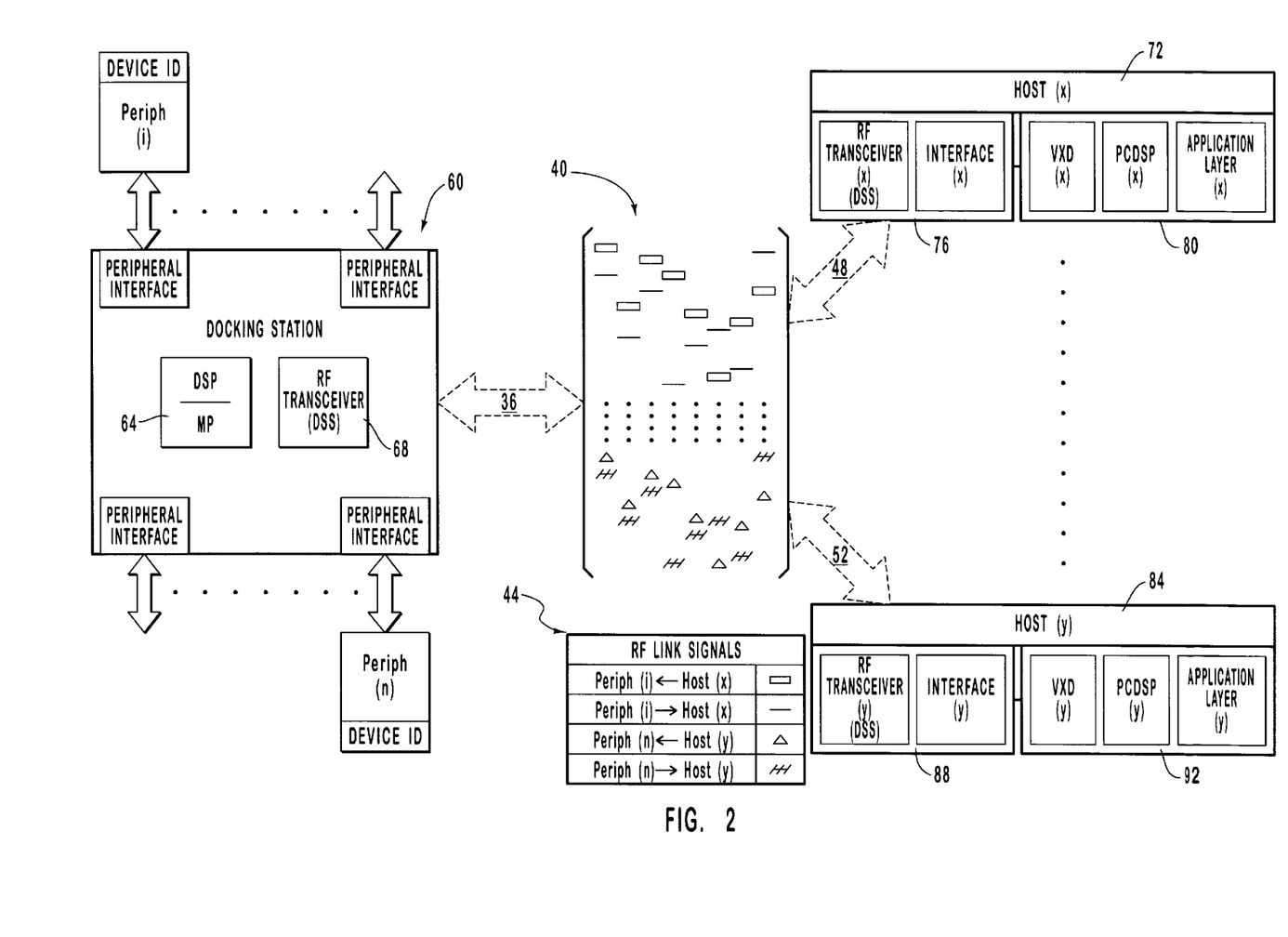
FIG. 2 is a top level block diagram depicting a RF link between hosts x through y to peripherals i through n that are interfaced to a remote docking station, where each host has an RF transreceiver, a virtual device driver, an interface between the virtual device driver and the RF transreceiver, a digital signal processor, and an application layer, wherein a program executing in the application layer of each of hosts x through y can control the input and/or output of peripherals i through n through the RF link using spread spectrum technology.

FIGS. 1 and 2 each depict an RF link between a plurality of computing apparatus and a plurality of peripheral devices. Hardware, software and power requirements of the peripheral devices in the inventive computing environment are placed at a remote docking station to which each peripheral device is interfaced. A benefit of the inventive computing environment is that each host need not have peripheral devices directing attached thereto. As such, interfaces to the host, other than the RF linking device, need not be present.

Figure 3:
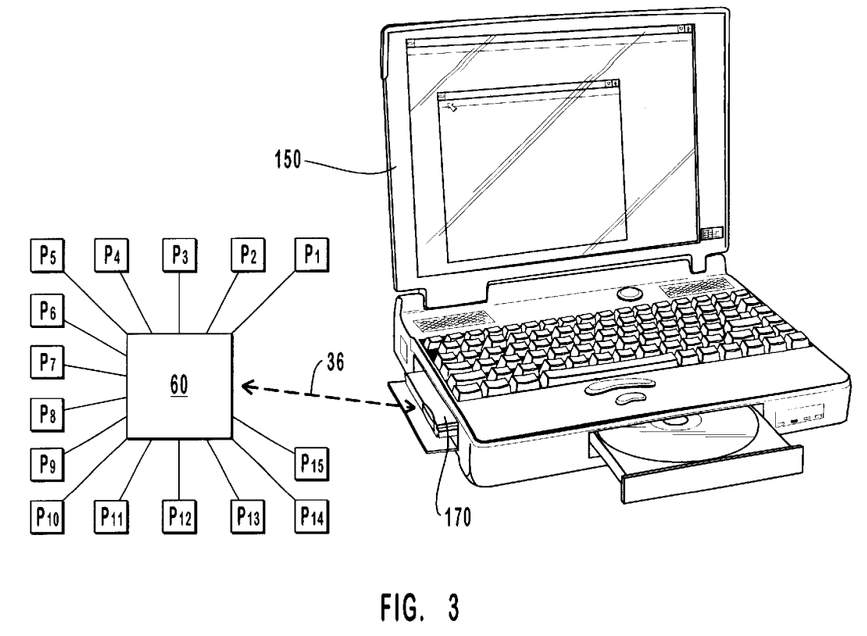
FIG. 3 is a partially cut away perspective view of a portable computer having installed therein a thin-architecture PC card that has an RF transreceiver thereon for transreceiving signals in an RF link with one or more peripheral devices.

Preferably, the RF link operating in each of the embodiments depicted in FIGS. 2 and 3 is a spread spectrum schema which the FCC and their counterparts outside of the U.S. have set aside as a bandwidth for unlicensed use in the so-called ISM (industrial, Scientific and Medical) bands. Spectrum in the vicinity of 2.4 GHz, in particular, is being made available worldwide. This bandwidth lends high speed capabilities to wireless applications. In order to manage interference without requiring cumbersome site licenses, regulatory agencies require that products developed for unlicensed use employ one of the two prevailing "spread spectrum" technologies.

Spread spectrum products are so named because they spread their transmitted signal over a wide range of the spectrum. They therefore avoid concentrating power in a single narrow frequency band. A spread spectrum system is any system that occupies more bandwidth than the minimum required for data signal transfer. In spread spectrum communications, a signal is modulated over a significantly larger bandwidth than is necessary for the given data rate for the purpose of lowering the bit error rate in the presence of strong interference signals. As such, the signal will occupy a bandwidth in excess of the minimum information bandwidth that would be required to transmit the information. Spread spectrum communications can be used to reduce the probability of the intercept of communications, protect against communications jamming, and minimize unintentional interference.

Spread spectrum technology is also called frequency hopping, and is specifically a modulation technique used in wireless systems. The data to be transmitted are packetized and spread over a wider range of bandwidth than demanded by the content of the original information. Spread spectrum takes an input signal, mixes it with FM noise, and "spreads" the signal over a broad frequency range. Spread spectrum receivers recognize a spread signal, acquire and "de-spread" the signal, and thus return it to its initial form, e.g. the original message. A large number of transmissions can be supported over a given range of frequencies, with each transmission comprising a packet stream, and with each packet in a stream being distinguished by a ID contained within the packet header. The receiver is able to distinguish each packet stream from all others by virtue of the ID in the packet, even though multiple transmissions share the same frequency at the same time, with the potential for overlapping the packets. Spread spectrum technology is used extensively in wireless LANs.

The RF link intended for the inventive computing environment can be either of two main alternatives, which are Direct Sequence Spread Spectrum (DSSS) and Frequency Hopping Spread Spectrum (FHSS). DSSS spreads the signal over a wide range of a 2.4 GHz frequency band. FHSS involves the transmission of short bursts of information over specific frequencies, with the frequency hopping carefully coordinated between transmitter and receiver.

FHSS involves the conversion of a data stream into a stream of packets, each of which is prepended by an ID contained in the packet header. Short bursts of packets then are transmitted over a range of 75 or more frequencies, with the transmitter and the receiver hopping from one frequency to another in a carefully choreographed "hop sequence." FCC regulations specify that each transmission can dwell on a particular frequency no more than 400 milliseconds. A large number of other transmissions also measure the same range of frequencies at the same time, with each using a difference hop sequence. The potential remains, however, for the overlapping of packets. The receiving device is able to distinguish each packet in a packet stream by reading the various IDs, treating competing signals as noise.

DSSS is a technique used in spread spectrum wireless systems and involves the conversion of a data stream into a stream of packets, each of which is prepended by an ID contained in the packet header. The stream of packets then is transmitted over a wide range of frequencies, using the approach known as "scattering." A large number of other transmissions also may share the same range of frequency at the same time, with the potential for overlapping of packets. The receiving device is able to distinguish each packet in a packet stream by reading the various IDs, treating competing signals as noise. In a wireless local area network environment, DSSS typically operates in the 2.4 GHz frequency band.

DSSS avoids excessive power concentration by spreading the signal over a wider frequency band. Each bit of data is mapped into a pattern of "chips" by the transmitter. At the destination the chips are mapped back into a bit, recreating the original data. Transmitter and receiver must be synchronized to operate properly. The ratio of chips per bit is called the "spreading ratio". A high spreading ratio increases the resistance of the signal to interference. A low spreading ratio increases the net bandwidth available to a user. The FCC requires that the spreading ratio must be greater than 10. A user can deploy more than one channel in the same area by separating the 2.4 GHz band into several sub-bands, each of which contains an independent DSSS network. Because DSSS truly spreads across the spectrum, the number of independent (i.e. non-overlapping) channels in the 2.4 GHz band is small. The main benefit (interference rejection) for DSSS is optimal at spreading ratios on the order of 100.

FHSS spreads the signal by transmitting a short burst on one frequency, "hopping" to another frequency for another short burst and so on. The source and destination of a transmission must be synchronized so they are on the same frequency at the same time. The hopping pattern (frequencies and order in which they are used) and dwell time (time at each frequency) are restricted by most regulatory agencies. For example, the FCC requires that 75 or more frequencies be used and a maximum dwell time of 400 ms. If interference occurs on one frequency, then the data is retransmitted on a subsequent hop on another frequency. A user can deploy more than one channel in the same area by implementing separate channels on different, orthogonal, hopping sequences. These different, orthogonal, hopping sequences are characterized and identified in a code in the spread signal that also identifies both the address of the device that is the source of the signal and the address device that is to receive the signal. This code is recognized by signal processing circuitry in an electronic device receiving the spread signal and is used to receive, acquire, and "despread" the spread signal back to its original message.

Because there are a large number of possible sequences in the 2.4 GHz band, FHSS allows many non-overlapping channels to be deployed. FHSS products spend milliseconds at each frequency. Noise on any given frequency will typically be absent after hopping to another frequency. DSSS products are stationary at a preselected frequency and cannot avoid such interference. Since FHSS is not stationary at a preselected frequency, an FHSS radio cannot be blocked by a single interferer." As such, "multipath" interference (caused by the signal bouncing off walls, doors or other objects and arriving at the destination at different times) is automatically avoided by FHSS systems but not by DSSS. FHSS inherently provides a solution to this problem by hopping to a different frequency which is not attenuated. Additionally, FHSS allows a large number of non-overlapping channels.

FHSS was originally deployed by the military because of the fact that it is difficult to intercept and jam. This advantage is now available to commercial users. There are infinite combinations of dwell times and hopping sequences. Capturing an FHSS signal would require significant development time and concerted effort. DSSS products, on the other hand, use a simple (usually 11-bit) spreading code that allows the transmission to be easily mapped back into the original data. Intercepting a DSSS signal simply requires capturing the signal and translating it back to the original data using a well-defined algorithm.

In spread spectrum technology, PN codes, also known as orthogonal codes, define a pattern of how the spread spectrum is to operate. The PN code allocates channels and where channel hopping is going to take place in spread spectrum. In the inventive system, the PN code uniquely defines the RF interface between a docking station and a portable computer.

Each peripheral interface has a unique PN code that differentiates a plurality of peripheral interfaces. PC cards are differentiated via a PN code. Each peripheral interface port will carry its own unique PN code to identify-each peripheral in communication with the respective peripheral interface port. Each portable computer has an associated transmit receive PN code. All the information associated with a PN code for portable computer will be transmitted along with the PN code thereof, and all of the information for a different portable computer will have a different PN code. When the respective PN codes of each device are differentiated, multiple portable computers can be in the same system, each using different peripheral devices.

In transmission of spread spectrum data, the PN code is generated, then mixed with the incoming data, and then sent to an antenna for transmission. In receiving spread spectrum data, a correlation function receives and compares against the PN code. The spread spectrum data is then 'de-spread' from the signal to its original message. The correlation function and the 'de-spread' function can be performed by an ASIC.

Referring to FIG. 1, an overall block diagram is depicted wherein reference numeral 20 represents a device including a control processor 24, an Application Specific Integrated Circuit (ASIC) 28, and a transreceiver 32. Control processor 24 is an electrical communication with interface $_i$ through interface$_n$. Interface$_i$ through interface$_n$, respectively, are in communication with peripheral device$_i$ through peripheral device$_n$. FIG. 1 depicts peripheral device$_i$ through peripheral device$_n$ at Periph$_i$ through Periph$_n$. Examples of intended a peripheral device include a mass storage device, a printer, a video capture device, an image scanning device, a local area network connection, a disk, tape, CD, or diskette drive, a copier, a facsimile transreceiving machine, a modem, an ISDN port, an ADSL port, a pager, a television, and an audiovisual device.

ASIC 28 performs the task of taking an outgoing message from a peripheral device, spreading the original message into a spectrum, and passing the same to be transmitted by transreceiver 32 by transreceiver paths 36, and 48 through 52. Additionally, ASIC 28 acquires an incoming message from a host computer that is received by transreceiver 32. ASIC 28 then de-spreads the spread signal into the original message, which is then processed by control processor 24 and communicated to a respective peripheral device. As such, control processor 24 provides synchronized communication between each peripheral interface and ASIC 28. By way of example, ASIC 28 may be a digital signal processor or a microprocessor.

Communication signals are seen at referenced No. 40 of FIG. 1. The signals are depicted in a frequency hopping pattern reflecting a frequency and order. The pattern has a certain dwell time at each frequency that is restricted by most regulatory agencies. If interference occurs on one frequency, than the data is retransmitted on a subsequent hop, on another frequency. The frequency hopping technology allows implementers to deploy more than one channel in the same area. This is accomplished by implementing separate channels on different, orthogonal, hopping sequences. Because there are a large number of possible sequences in the 2.4 GHz band, frequency hopping allows many non-overlapping channels to be deployed.

Signal legend 44 depicts symbols representative of the transmission of signals from host$_x$ to peripheral device$_i$, from peripheral device$_i$ to host$_x$, from host$_y$ to peripheral device$_n$, and from peripheral device$_n$ to host$_y$. As such, the signal chart at reference No. 40 shows two non-overlapping channels, as well as a plurality of others representative by an extrapolation thereof. The signal legend 44 shows the representation for each of the foregoing transreceived signal depicted at Reference No. 40. Arrows 36, 48, and 52 show the transreceiving paths of frequency hop signal patterns between hosts$_x$ through hosts$_y$ and transreceiver 32.

Host$_x$ through host$_y$ each contain a transreceiver, an interface, and a computing apparatus. The interface acquires a spread signal from the transreceiver and de-spreads the signal into the original message which is then processed by the computing apparatus. Similarly the computing apparatus provides an outgoing message to the interface which is spread using spread spectrum technology and is then transmitted by the transreceiver.

In the transmitted spread signal there is contained an identification code that identifies the particular host or peripheral device for which the signal is to be delivered. Similarly, the transreceived spread signal contains an identification of the particular host or peripheral device from which the message in the signal originates.

While signal legend 44 in FIG. 1 shows different symbols representative of different signals, it is intended that each spread signal contains a identification code, header ID, or tuples address that will provide identification of both originating or destination host computer and peripheral device.

FIG. 2 is a top level block diagram depicting an RF link between host$_x$ and host$_y$ and peripheral device$_i$ through peripheral device$_n$, where each peripheral device is connected to a remote docking station 60 by respective peripheral interfaces. By way of example, a peripheral interface can be a serial port, an parallel port, a USB port, a multi-conductor connector, such as a Registered Jack connector (e.g. RJ-14), and a Recommended Standard connector (e.g. RS-232). Examples of intended peripheral devices include a mass storage device, a printer, a video capture device, an image scanning device, a local area network connection, a disk, tape, CD, or diskette drive, a copier, a facsimile transreceiving machine, a modem, an ISDN port, an ADSL port, a pager, a television, and an audiovisual device.

Each host has an RF transreceiver, a virtual device driver, an interface between the RF transreceiver and the virtual device driver, an digital signal processor, and an application layer. By way of example, the interface between the RF transreceiver and the virtual device driver can be a PC Card, a serial port, an parallel port, a USB port, a multi-conductor connector, such as a Registered Jack connector (e.g. RJ-14), and a Recommended Standard connector (e.g. RS-232). Preferably, the interface will be a PCMCIA card.

Remote docking station 60 also has a digital signal processor and a transreceiver in communication with transreceiver paths 36, and 48 through 52. Through the digital signal processor and the transreceiver of docking station 60 signals are sent from each peripheral device to a particular host computer and signals are sent from each host computer to a particular peripheral device.

Through the digital signal processor and the transreceiver of each host computer, messages are sent from the application layer to the virtual device driver for placement in signals to be sent to the transreceiver in remote docking station 60. Through the digital signal processor and the transreceiver of each host computer, signals from a particular peripheral device directed to a respective host computer are de-spread by the digital signal processor into messages that are communicated to the virtual device driver for the processing of the message by the application layer. In this way, application programs executing in each host computer can control input and/or output of each peripheral device by the RF link using spread spectrum technology.

The thin architecture PC Card architecture of the inventive computing wireless computing environment utilizes a single card transreceiver incorporating spread spectrum technology to establish an RF link between a mobile computing apparatus such as a portable computer, and a remote docking station also having a transreceiver. The remote docking station supports multiple peripheral interfaces to multiple respective peripheral devices. The thin architecture PC Card received by a portable computer is preferably a PCMCIA card. Preferably, all of the peripheral devices are physically located at the remote docking station rather than at the computing apparatus.

The docking station has an interface port for each peripheral. Each interface port has its own unique code to identify it. The interface port for the peripheral devices provide an extensible interface that expand as new technology produces new peripheral devices.

Typical peripheral devices that can be attached or interfaced via ports to the remote docking station are modems, ISDN ports, ADSL ports, storage devices, printers, video capture devices, local area network connections, facsimile machines, etc.

The inventive system uses a peripheral identification device in communication with a host computer to identify peripherals connected by peripheral interface devices at a docking station across an RF link. The peripherals are identified by the peripheral identification device by a process that transmits peripheral information from the docking system to a transceiver at the host computer. The host computer then identifies each of the peripherals and their characteristics and capabilities. In the invention system, both the RF link and the remote location of the peripherals are transparent to the host computer.

PCMCIA card uses tuples to identify peripheral devices and their respective capabilities. Tuples define the memory space that the device can use and the general attributes of a PCMCIA card. A tuple is a software/hardware combination defined by the PCMCIA specification as to how a device is recognized across the PCMCIA bus. Like tuples in a PCMCIA card, a PC card has an identifying element called a header ID which enables similar functions as the tuple. As used herein and as is evident from context, the tuple and the PCMCIA card are interchangeable, respectively, with the header ID and the PC Card.

Each peripheral will have a set of tuples addresses where a PCMCIA card is in communication with a portable computer. Where the identification device is a PCMCIA card, the transreceived peripheral information is in the form of tuples. Where a PCI or PC Card is in communication with a portable computer, a header identifier will be associated with each peripheral. Where the identification device is a PC card, the transreceived peripheral information is in the form of header IDs. In either case, be it a set of tuple addresses for a PCMCIA card or a header identifier for PCI or PC card, there will be a unique identification mechanism to allow for automatic identification and configuration of the peripheral device to the portable computer. The tuple address or header information will be transferred on each hopped channel pattern and identify each device as needed.

At the time that the portable computer is booted, the portable computer configures a PCMCIA card inserted into a PCMCIA slot. The remote docking station passes tuples identifiers to the PCMCIA card transreceiver so that the operating system there will be in communication with the peripherals at the remote docking station. The PCMCIA card in the portable computer has its own tuple identifying set to identify the portable computer and its characteristics, as well as to have information that its going to be interfacing with a wireless docking station. The portable computer uses standard PC card protocol to identify that a PC card is installed. By reading the tuple information for each of a plurality of peripheral devices, the PCMCIA card identifies each of the plurality of peripheral devices that are in communication with the PCMCIA card. A device driver is then installed in the portable computer for each peripheral in communication with the PCMCIA card. Once the portable computer has the device drivers installed it, the portable computer will recognize the PCMCIA card each time the PCMCIA card is installed in the portable computer and thereafter will attempt to verify that all of the tuple information is present for each peripheral for which a device driver has been installed.

The PCMCIA card has an RF transceiver that is able to address a certain number of peripheral devices via a tuples addressing schema depending upon signals detected by the PCMCIA card in the transceiver path. The PCMCIA card has the ability to stack on a number of tuple identifiers that identify a plurality of peripheral devices, where the tuple identifies are transferred over to the PCMCIA card by way of a remote docking station via an RF link.

The docking station repeats over the tuple information to the PCMCIA card in the portable computer. The PCMCIA card then uses the tuple identifiers to configure the portable computer as if the portable computer had a multiple number of PCMCIA cards in communication therewith. By way of example, the portable computer can use a PCMCIA card with the RF transreceiver to communicate to a plurality of peripherals at a remote docking station, where the peripherals at the docking station include a local area network connection, a modem, or a video capture card, or a printer. The portable computer operates in a mode of having a multiple function PCMCIA card installed therein by virtue of the tuple information received by the portable computer from the remote docking station. As such, the PCMCIA interface to the plurality of peripherals is stretched across an RF link.

When a remote docking station has three peripherals connected by peripheral interfaces thereto, the tuple information for each peripheral is passed from the transreceiver at the docking stations in three channels. The three channels are downloaded to the RF transreceiver at the PCMCIA card of a host portable computer. An Digital Signal Processor (DSP), Application Specific Integrated Circuit (ASIC), or controller, either in the portable computer or on the PCMCIA card, takes the three channels, divides them up into three tuple header information channels, and the original message is then processed by the portable computer.

The inventive wireless architecture computing system places the majority of processing on a remote docking station side of the RF link to a portable computer. This effectively turns the thin architecture PC card into a card that is limited only by the number of interface ports to peripheral devices on the docking station, and the bus architecture used therein. Thus, the form factor limitation is eliminated on the thin architecture PC card. Moreover, a distinct advantage of this architecture is efficient power distribution due to the placement of high current usage devices, such as DSP, RAM, and controller chip on chipset devices, on the remote docking station, as opposed to being on the thin architecture PC Card. As such, a more efficient battery usage is provided for the portable computer.

Figure 4:
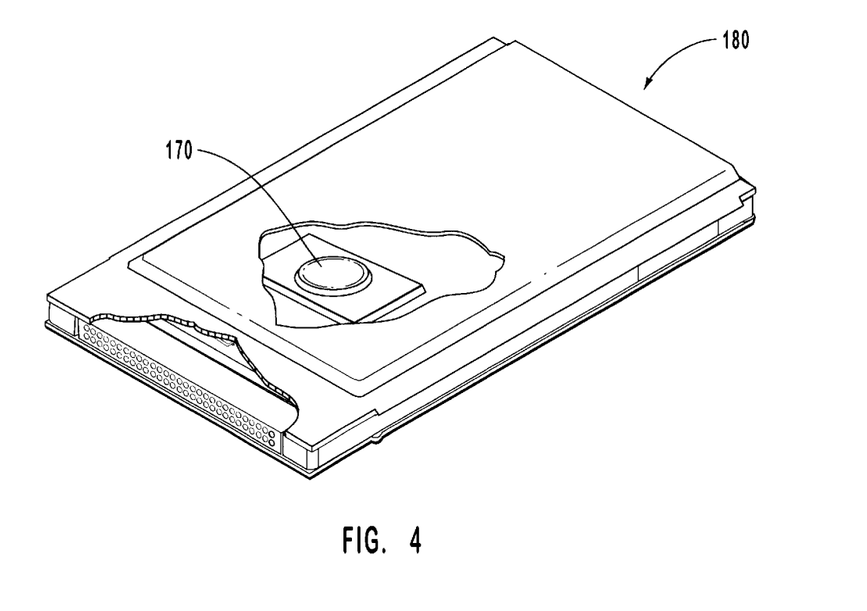
FIG. 4 is a partially cut away perspective view of a thin-architecture PC card incorporating an RF transreceiver.
Figure 5:
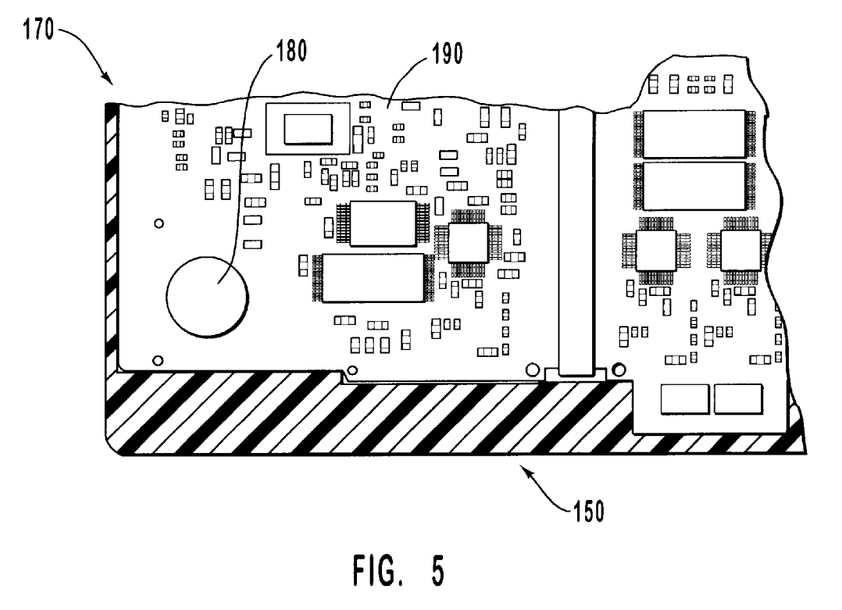
FIG. 5 is a top plan partial cut away view of a PCMCIA or other thin-architecture card inserted within a portable computer, the card has thereon an RF transreceiver.

FIGS. 3 though 5 show preferred embodiments of the inventive computing system. FIG. 3 depicts a down-sized computer, such as a notebook or laptop computer, seen as a portable computer 150. Portable computer 150 typically weighs less than 6 pounds and is small enough to easily fit in a conventional briefcase. A PC card 170, preferably a PCMCIA card, terminates at an insert slot on the side of portable computer 150. PC Card 170 has an RF transreceiver thereon communicating via a transreceiver path 36 with a docking station 60 also having a transreceiver thereon. Peripheral device $P_1$ through $P_{15}$ communicate through docking station 60 to portable computer 150. Hardware, circuitry, and software to carry out the spread spectrum operation, such as spreading and 'de-spreading' spread spectrum signals, can be placed and executed on PC Card 170, portable computer 150, or partially on both. Preferably, most if not all of the hardware, circuitry, and software to spread and 'de-spread' spread spectrum signals will be on the portable computer 150 in view of the form factor constraints in PC Card 170, as well as to avoid excessive thermal build up therein.

FIG. 4 shows a perspective partial cut away view of a thin-architecture PC card or PCMCIA card 170 having a RF transreceiver 180 thereon.

FIG. 5 is a top plan partial cut away view of a PCMCIA or other thin-architecture card 170 inserted within a portable computer 150, shown in cut away, the card 170 having a RF transreceiver 180 mounted on a PC board 190.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A computing system having a communications link between an application program and a peripheral device, the computing system comprising:
   a peripheral device for generating a peripheral message and for executing a device driver message;
   a first transreceiver for transmitting a peripheral spread spectrum signal and for receiving a device driver spread spectrum signal;
   a first controller, in communication with the peripheral device and the first transreceiver, for:
      receiving the peripheral message from the peripheral device;
      spreading the peripheral message into the peripheral spread spectrum signal;
      communicating the peripheral spread spectrum signal to the first transreceiver;
      de-spreading the device driver spread spectrum signal into the device driver message; and
      communicating the device driver message to the peripheral device;
   a first program memory, in communication with the first transreceiver and the first controller, for storing a spread spectrum communications protocol program to be executed by first controller and the first transreceiver;
   a second transreceiver for transmitting the device driver spread spectrum signal and for receiving the peripheral spread spectrum signal;
   a second controller, in communication with the second transreceiver, for:
   spreading the device driver message into the device driver spread spectrum signal;
   communicating the device driver spread spectrum signal to the second transreceiver;
   de-spreading the peripheral spread spectrum signal into the peripheral message;
   communicating the peripheral message to the device driver; and
   executing an application program, in communication with the device driver, to demand:
      execution of the device driver message by the peripheral device; and
      generation of the peripheral message by the peripheral device; and
   a second program memory, in communication with the second transreceiver and the second controller, for storing:
      the device driver;
      the application program; and
      a spread spectrum communications protocol program to be executed by second controller and the second transreceiver.

2. The computing system as defined in claim 1, wherein the peripheral device is selected from the group consisting of a printer, a video capture device, an image scanning device, a local area network connection, a disk, tape, CD, or diskette drive, a copier, a facsimile transreceiving machine, a modem, an ISDN port, an ADSL port, a pager, a television, and an audiovisual device.

3. The computing system as defined in claim 1, wherein the pattern of the device driver spread spectrum signal and the pattern of peripheral spread spectrum signal are patterns according to DSSS.

4. The computing system as defined in claim 1, wherein the pattern of the device driver spread spectrum signal and the pattern of peripheral spread spectrum signal are patterns according to FHSS.

5. The computing system as defined in claim 1, wherein the second transceiver is disposed on a device that is selected from the group consisting of a portable computer, a PDA, a barcode scanner, a PC card, and a PCMCIA card.

6. A computing system having a communications link, the computing system comprising:
   a peripheral device for executing an I/O message;
   a computing device having a transreceiver for:
     transmitting a host spread spectrum signal that identifies a PN code and one of a tuple set and a header ID that directs the peripheral device to execute an I/O message in said host spread spectrum signal, wherein the I/O message is formatted in accordance with a device driver for the peripheral device that is executing at the computing device; and
     receiving a peripheral spread spectrum signal that identifies a PN code and one of a tuple set and a header ID that directs an I/O message in the peripheral spread spectrum signal to the computing device, wherein the I/O message is received in accordance with the device driver; and
   a singular hub transreceiver, interfaced to the peripheral device, for:
     transmitting a peripheral spread spectrum signal from the peripheral device that identifies a PN code and one of a tuple set and a header ID that directs an I/O message in said peripheral spread spectrum signal to the computing device; and
     receiving a host spread spectrum signal that identifies a PN code and one of a tuple set and a header ID that directs the execution of an I/O message in the host spread spectrum signal by the peripheral device.

7. The computing system as defined in claim 6, wherein the computing device controls the peripheral device across the spread spectrum communications link.

8. The computing system as defined in claim 6, wherein the peripheral device is selected from the group consisting of a printer, a video capture device, an image scanning device, a local area network connection, a disk, tape, CD, or diskette drive, a copier, a facsimile transreceiving machine, a modem, an ISDN port, an ADSL port, a pager, a television, and an audiovisual device.

9. The computing system as defined in claim 6, wherein the computing device is selected from the group consisting of a portable computer, a PDA, a barcode scanner, a PC card, and a PCMCIA card.

10. A computing system having a communications link, the computing system comprising:
    a plurality of peripheral devices each for executing an I/O message;
    a plurality of computing devices each having a transreceiver for:
      transmitting a host spread spectrum signal that identifies a PN code and one of a tuple set and a header ID that directs one peripheral device of said plurality of peripheral devices to execute an I/O message in said host spread spectrum signal, wherein the I/O message is formatted in accordance with a device driver for the directed one peripheral device and that is executing at the computing device; and
      receiving a peripheral spread spectrum signal that identifies a PN code and one of a tuple set and a header ID that directs an I/O message in the peripheral spread spectrum signal to one of said plurality of computing devices, wherein the I/O message is received in accordance with a device driver associated with an originating peripheral device and executing at the one computing device; and
    a singular hub transreceiver, interfaced to each of said plurality of peripheral devices, for:
      transmitting a peripheral spread spectrum signal from one of said plurality of peripheral devices that identifies a PN code and one of a tuple set and a header ID that directs an I/O message in said peripheral spread spectrum signal to one of said plurality of computing devices; and
      receiving a host spread spectrum signal that identifies a PN code and one of a tuple set and a header ID that directs the execution of an I/O message in the host spread spectrum signal by one of said plurality of peripheral devices.

11. The computing system as defined in claim 10, wherein each computing device controls each peripheral device across the spread spectrum communications link.

12. The computing system as defined in claim 10, wherein each of said plurality of peripheral devices is selected from the group consisting of a printer, a video capture device, an image scanning device, a local area network connection, a disk, tape, CD, or diskette drive, a copier, a facsimile transreceiving machine, a modem, an ISDN port, an ADSL port, a pager, a television, and an audiovisual devices.

13. A computing system having a communications link between a plurality of peripheral devices and a computerized host executing an application program, the computing system comprising:
    a peripheral hub including:
      a plurality of peripheral devices each generating a peripheral message and executing a device driver message;
      a hub transreceiver for transmitting a peripheral spread spectrum signal and for receiving a device driver spread spectrum signal;
      a hub controller, in communication with each of said plurality of peripheral devices and the hub transreceiver, for:
        receiving a peripheral message from one of said plurality of peripheral devices;
        spreading the peripheral message into the peripheral spread spectrum signal;
        communicating the peripheral spread spectrum signal to the hub transreceiver;
        de-spreading the device driver spread spectrum signal into the device driver message; and
        communicating the device driver message to one of said plurality of peripheral devices; and
      a hub program memory, in communication with the hub transreceiver and the hub controller, for storing a spread spectrum communications protocol program to be executed by hub controller and the hub transreceiver; a computerized host including:
      a host transreceiver for transmitting the device driver spread spectrum signal and for receiving the peripheral spread spectrum signal;

a host controller, in communication with the host transreceiver, for:
  executing a device driver to generate the device driver message;
  spreading the device driver message into the device driver spread spectrum signal;
  communicating the device driver spread spectrum signal to the host transreceiver;
  de-spreading the peripheral spread spectrum signal into the peripheral message;
  communicating the peripheral message to the device driver; and
  executing an application program, in communication with the device driver, to demand:
    execution of the device driver message by one of said plurality of peripheral devices; and
    generation of the peripheral message by one of said plurality of peripheral devices; and
a host program memory, in communication with the host transreceiver and the host controller, for storing:
  the device driver;
  the application program; and
  a spread spectrum communications protocol program to be executed by host controller and the host transreceiver.

14. A computing system having a communications link between a plurality of peripheral devices and a plurality of application programs executing on a respective plurality of computerized hosts, the computing system comprising:
  a peripheral hub including:
    a plurality of peripheral devices each:
      generating a peripheral message identifying one of a plurality of computerize hosts; and
      executing a device driver message that identifies the peripheral device;
    a hub transreceiver for transmitting a peripheral spread spectrum signal and for receiving a device driver spread spectrum signal;
    a hub controller, in communication with each of said plurality of peripheral devices and the hub transreceiver, for:
      receiving a peripheral message identifying one of a plurality of computerize hosts from one of said plurality of peripheral devices;
      spreading the peripheral message into the peripheral spread spectrum signal;
    communicating the peripheral spread spectrum signal to the hub transreceiver;
      de-spreading the device driver spread spectrum signal into the device driver message; and
    communicating the device driver message identifying one of said plurality of peripheral devices to the respect peripheral device so identified; and
  a hub program memory, in communication with the hub transreceiver and the hub controller, for storing a spread spectrum communications protocol program to be executed by hub controller and the hub transreceiver; and a plurality of computerized hosts each including:
  a host transreceiver for transmitting the device driver spread spectrum signal and for receiving the peripheral spread spectrum signal;
  a host program memory, in communication with the host transreceiver and the host controller, for storing:
    a device driver;
    an application program; and
    a spread spectrum communications protocol program; and
  a host controller, in communication with the host transreceiver, for:
    executing a device driver to generate the device driver message that identifies one of said plurality of peripheral devices;
    executing the spread spectrum communications protocol program to:
      spread the device driver message into the device driver spread spectrum signal;
      communicate the device driver spread spectrum signal to the host transreceiver; and
      de-spread the peripheral spread spectrum signal into the peripheral message that identifies the computerized host;
    communicating the peripheral message to the device driver; and
    executing the application program, in communication with the device driver, to demand:
      execution of the device driver message by one of said plurality of peripheral devices; and
      generation of the peripheral message by one of said plurality of peripheral devices.

15. A computing system having a communications link, the computing system comprising:
  a plurality of peripheral devices;
  at least one host computer having a communications card, wherein the communications card includes a host transceiver capable of wirelessly transmitting output from the host computer as a host spread spectrum signal output that is directed to a destination peripheral device selected from one of the plurality of peripheral devices, and wherein the signal output is formatted in accordance with a device driver associated with the destination peripheral device and executing at the host computer; and
  a unitary docking hub interconnected with each of the plurality of peripheral devices, the docking hub including a hub transceiver, wherein the hub transceiver is capable of receiving and then wirelessly transmitting output from one of the plurality of peripheral devices to the at least one host computer as a peripheral spread spectrum signal output, and wherein the transceiver is capable of wirelessly receiving the host spread spectrum signal output from the at least one host computer for receipt by a specified one of the plurality of peripheral devices.

16. A computing system as defined in claim 15, wherein the unitary docking hub further comprises circuitry for de-spreading the host spread spectrum signal output received from the at least one host computer and for spreading output received from one of the plurality of peripheral devices into the peripheral spread spectrum signal output.

17. A computing system as defined in claim 16, wherein the at least one host computer further comprises circuitry for spreading output from the at least one host computer into the host spread spectrum signal output.

18. A computing system as defined in claim 15, wherein the communications card is compliant with PCMCIA form factors.

19. A computing system as defined in claim 15, wherein the at least one host computer is selected from the group consisting of a portable computer, a PDA, a barcode scanner, a PC card, and a PCMCIA card.

20. A method of establishing a communication link between a plurality of peripheral devices and at least one host computer, the method comprising the acts of:
  by one of the peripheral devices, producing a first signal;

forwarding the first signal to a unitary docking hub;

by the unitary docking hub, converting the first signal to a first spread spectrum signal;

wirelessly transmitting the first spread spectrum signal to the at least one host computer;

by circuitry disposed in relation to the at least one host computer, converting and processing the first spread spectrum signal in accordance with a device driver application executing at the host computer;

by the at least one host computer, producing a second signal;

by the circuitry disposed in relation to the at least one host computer, converting the second signal to a second spread spectrum signal in accordance with the device driver application;

wirelessly transmitting the second spread spectrum signal to the unitary docking hub;

by the unitary docking hub, converting the second spread spectrum signal to a de-spread spectrum signal; and forwarding the de-spread spectrum signal to a specified one of the plurality of peripheral devices.

21. A method of establishing as defined in claim 20, wherein the unitary docking hub is connected to each peripheral device by a physical communication line.

22. A system for interconnecting peripherals with a host device, the system comprising:

a plurality of peripheral devices;

a wireless hub, directly connected to each of the plurality of peripheral devices via separate defined interfaces, wherein the wireless hub provides a separate and distinct peripheral wireless channel that is dedicated to each one of the plurality of peripheral devices; and a host device having a wireless transceiver capable of communicating via each of the peripheral wireless channels, wherein peripheral messages are exchanged between an application executing on the host device and a given peripheral device via a corresponding peripheral wireless channel in a manner such that the given peripheral device appears to the application to be directly connected to the host device.

23. A system as defined in claim 22, wherein the peripheral messages are sent via a spread spectrum wireless signal.

24. A system as defined in claim 22, wherein the wireless transceiver is implemented as a device selected from the group consisting of a PCMCIA card and a PC card.

25. A computing system having a communications link between an application program and a peripheral device, the computing system comprising:

a peripheral device for generating a peripheral message and for executing a device driver message;

a hub, directly connected to the peripheral device, the hub including a wireless transceiver capable of wirelessly transmitting the peripheral message generated by the peripheral device, and for wirelessly receiving a device driver message destined for the peripheral device;

a host device, remotely positioned from the hub, having a host transceiver capable of wirelessly transmitting the device driver message and wirelessly receiving the peripheral message, wherein the peripheral message is provided to an application executing at the host device in accordance with a device driver executing at the host device, and the device driver message is generated by an application in accordance with a device driver executing at the host device, whereby the peripheral device appears to the application to be directly connected to the host device.

26. A system as defined in claim 25, wherein the peripheral message and the device driver message is sent wirelessly in accordance with a spread spectrum protocol.

27. A system as defined in claim 25, wherein the wireless host transceiver is implemented as a device selected from the group consisting of a PCMCIA card and a PC card.

* * * * *